United States Patent [19]

Trinkwalder, Jr.

[11] Patent Number: 4,462,417

[45] Date of Patent: Jul. 31, 1984

[54] VALVE ASSEMBLY

[75] Inventor: Joseph C. Trinkwalder, Jr., North Tonawanda, N.Y.

[73] Assignee: Sherwood Selpac Corp., Lockport, N.Y.

[21] Appl. No.: 419,821

[22] Filed: Sep. 20, 1982

[51] Int. Cl.³ ............... F16K 17/36; F16K 31/18
[52] U.S. Cl. .................... 137/39; 137/389; 137/390; 137/442; 137/449; 137/614.21; 141/213; 141/216
[58] Field of Search ........... 137/39, 389, 390, 442, 137/446, 449, 614.21; 141/198, 212, 213, 216

[56] References Cited

U.S. PATENT DOCUMENTS

| | | | |
|---|---|---|---|
| 1,623,374 | 4/1927 | Anderson | 137/449 |
| 2,200,697 | 5/1940 | Lindley | 137/390 |
| 2,246,388 | 6/1941 | Sica | 137/442 X |
| 2,385,489 | 9/1945 | Benz | 137/614.21 X |
| 2,767,551 | 10/1956 | Clute | 137/390 X |
| 2,767,552 | 10/1956 | Clute | 137/390 X |
| 3,850,189 | 11/1974 | Follett | 137/39 |
| 4,064,907 | 12/1977 | Billington | 137/446 X |

FOREIGN PATENT DOCUMENTS 1309289  10/1962  France ...................... 137/614.21

Primary Examiner—Robert G. Nilson
Attorney, Agent, or Firm—Sommer & Sommer

[57] ABSTRACT

A valve assembly, mountable on a propane or LPG cylinder, has a gate valve to regulate flow. An auxiliary valve element is movable in response to the liquid level within the tank, and to pressure differentials in the outflow direction. The auxiliary valve interrupts flow through the valve to prevent an overfill condition, or if the valve's outlet communicates with atmospheric pressure, or if the cylinder is knocked over.

5 Claims, 3 Drawing Figures

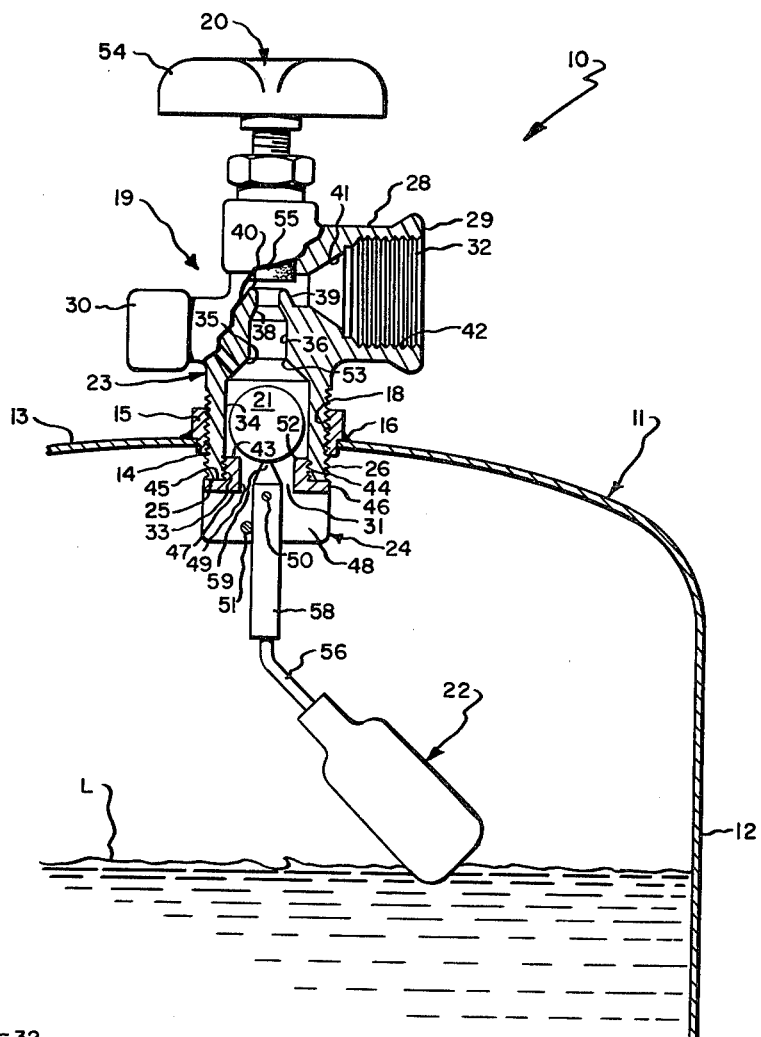
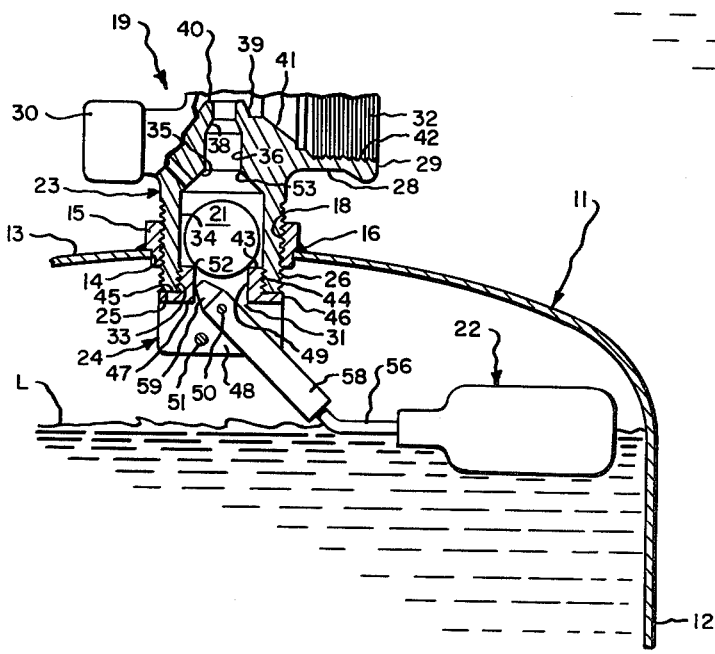
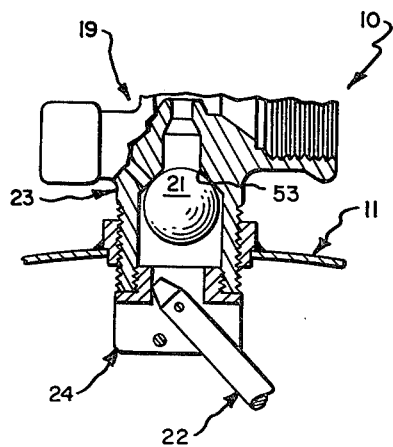

VALVE ASSEMBLY

BACKGROUND OF THE INVENTION

1. Field of the Invention

The present invention relates generally to the field of valves, and more particularly, to an improved valve assembly for use in association with a storage tank or "cylinder" containing a gaseous fuel, such as propane or LPG.

2. Description of the Prior Art

Cylinder valves are, of course, known, and examples thereof are shown in one or more of the following issued U.S. Pat. Nos. 4,210,168; 2,415,258; 3,285,274; and 3,981,328.

Such cylinders are in widespread use today, and are generally refillable. However, when refilling fuel storge tanks through such valves, care must be taken to insure that the refilled liquid does not exceed a maximum level. The reason for this is that such refilling operations normally occur at a colder-than-ambient condition. When subsequently uncoupled from its refilling source, the liquid in the tank warms and expands. Unless there is ullage or headspace within the tank at ambient temperature, such expansion of the liquid may cause liquid to spew from a safety release valve. Otherwise the tank may rupture.

More recently, others have attempted to design cylinder valves having overfill preventing features, as shown in U.S. Pat. Nos. 3,929,155 and 4,142,552.

SUMMARY OF THE INVENTION

The present invention provides an improved valve assembly which is adapted to be mounted on a fuel storage tank.

The improved valve assembly broadly comprises: a body adapted to be mounted on the tank, the body having an inlet arranged within the tank, having an outlet arranged without the tank, and having an internal passageway communicating the inlet and the outlet, the body also having first and second valve seats surrounding the passageway; a flow metering valve mounted on the body and having a member selectively movable toward and away from the first valve seat for controlling the flow of fluid through the passageway; a valve element mounted in the passageway for movement toward and away from the second valve seat, the element being arranged to prevent flow through the passageway from the outlet to the inlet when the element engages the second seat, and a float mounted on the body and arranged to sense the level of liquid within the tank, the float being operative to hold the element off the second seat when the sensed liquid level is less than a predetermined maximum level, and operative to permit the element to engage the second seat when the sensed liquid level is greater than the predetermined maximum level.

Accordingly, the general object of the invention is to provide an improved cylinder valve.

Another object is to provide an improved cylinder valve which interrupts reverse flow from an outlet to an inlet thereof when the liquid level within an associated tank exceeds a predetermined maximum level.

Another object is to provide an improved cylinder valve which interrupts flow therethrough in the event of an excess pressure differential between the valve's inlet and outlet.

Another object is to provide an improved tank-mounted cylinder valve which interrupts normal outflow therethrough, in the event that the associated tank is knocked over.

These and other objects and advantages will become apparent from the foregoing and ongoing written specification, the drawings, and the appended claims.

BRIEF DESCRIPTION OF THE DRAWINGS

FIG. 1 is a fragmentary vertical sectional view of the improved valve assembly mounted on a tank.

FIG. 2 is a fragmentary vertical sectional view thereof, similar to FIG. 1, but showing the float as having sensed that the liquid level has exceeded a predetermined maximum level, and allowing the spherical ball to sealingly engage the second seat.

FIG. 3 is a fragmentary vertical sectional view thereof, similar to FIG. 2, but showing the spherical ball as having sealingly engaged the third seat.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written description of which this detailed description is an integral part.

Referring now to the drawings, and more particularly to FIG. 1 thereof, the invention provides an improved valve assembly, of which the presently preferred embodiment is generally indicated at 10, which is adapted to be mounted on a fuel storage tank 11. Tank 11 is illustrated as being in the form of a "cylinder", and has a cylindrical side wall 12 and a domed top 13 provided with a central opening 14 therethrough. A collar 15 is suitably secured to the tank top, as by peripheral weldment 16, and is provided with an internally-threaded portion 18 to receive valve assembly 10. In this preferred embodiment, tank 11 contains liquid propane to a level L. The headspace or ullage above this liquid is, of course, filled with propane gas. As propane gas is withdrawn from the tank through valve assembly 10, some of the liquid propane will be converted to its gaseous form to replace that which has been consumed. Of course, propane is only one example of a larger number of fuels which may be contained within tank 11. Similarly, this particular "cylinder" form of tank 11 is only one example of a large variety of tanks and storage devices upon which the improved valve assembly may be mounted.

The inventive valve assembly 10 is depicted as broadly including a body 19, a flow-metering valve 20, a valve element 21, and a float 22.

Body 19 is of two-piece construction and has an upper main portion 23 adapted to be threaded into the tank collar, and has a lower fitting 24 arranged within the tank.

The body main portion 23 outwardly seems to be a conventional cast cylinder valve having a somewhat cross-shaped appearance. Body portion 23 has, in pertinent part, an annular horizontal lower surface 25, an outer surface including externally-threaded portion 26 engageable with collar threads 18, and a rightwardly-extending tubular portion 28 terminating in an annular vertical surface 29. A leftwardly-extending portion 30 of the body houses a conventional pressure relief valve.

Body portion 23 is also provided with an internal passageway which communicates its inlet 31 and outlet 32. This passageway is bounded by an internally-threaded portion 33 surrounding the inlet opening 31 and extending upwardly from lower face 25, a cylindrical surface 34 continuing upwardly therefrom, an upwardly-convergent frusto-concial surface 35, a cylindrical surface 36 continuing upwardly therefrom, an upwardly-convergent frusto-concial surface 38, a somewhat T-shaped surface 39 having an upwardly-facing annular horizontal seat 40, a rightwardly-divergent frusto-concial surface 41, and an internally-threaded portion 42 extending rightwardly therefrom to surround outlet opening 32 and terminating at surface 29.

Body fitting 24 has an annular horizontal upper face 43, an outer surface including an externally-threaded portion 44 extending downwardly from upper face 43, an upwardly-facing annular horizontal surface 45, a cylindrical surface 46 extending downwardly therefrom, and a downwardly-facing annular horizontal lower face 47. Two horizontally-spaced rectangular plates, one of which is indicated at 48, extend vertually downwardly from lower face 47. An axial through-bore, bounded by cylindrical surface 49 communicates the upper and lower faces 43,47 of the body fitting. A horizontal pivot pin 50 extends between the two plates and is arranged immediately beneath lower face 47. A horizontal stop pin 51 also spans the two plates, although arranged further beneath surface 47. Fitting 24 is threaded into the lower end of the body main portion such that surfaces 33,44 are in meshing engagement, and surfaces 25,45 are in abutting contact. The assembled body has three seats spaced along and surrounding the internal passageway. The first seat is indicated at 40. The second seat is formed by the intersection of fitting surfaces 43,49, and is indicated at 52. The third seat is formed by the intersection of body main portion surfaces 35,36, and is indicated at 53.

The flow metering valve 20 is shown as being of the gate valve type, and has a handle 54 which may be grasped and rotated in the appropriate angular direction to move a member 55 vertically toward and away from the first seat 40. This gate valve provides the primary means by which flow through the valve assembly may be selectively regulated and controlled.

The valve element 21 is simply a spherical ball arranged within the body passageway for movement between the lower second seat 52 and the upper third seat 53.

Float 22 has a shape which somewhat resembles a $CO_2$ cartridge, and is connected via a dog-leg shaped rod 56 to a member 58 having a cylindrical body and a frusto-concial nose 59. Member 58 is pivoted intermediately on pivot pin 50. When the liquid level L is below a predetermined maximum level, the offset weight of float 22 holds member 58 in a vertical position, with its cylindrical body engaging stop pin 51. In this condition, the nose 59 of member 58 holds ball 21 off seat 52 (FIG. 1), thereby allowing flow through the passageway. However, if the liquid level L is above the predetermined maximum, the float 22 will rise, thereby causing the member 58 to pivot in a counter-clockwise direction to an out-of-the-way position (FIG. 2). In this condition, ball 21 is free to sealingly engage seat 52 and block the passageway.

Operation

During normal operation, the improved valve assembly operates ostensibly in the conventional manner. Thus, an operator can simply manipulate the handwheel 54 to control flow through the valve. In normal operation, the weight of spherical ball 21 keeps it off seat 53. However, should the outlet flow be too great, as by a hose or conduit connecting the valve assembly to a serviced appliance being severed, then the increased outrush of gas through the body passageway will be sufficient to move ball 21 upwardly into sealing engagement with seat 53, as shown in FIG. 3. If the outlet is at ambient pressure, then the differential pressure will hold the ball in this condition, thereby preventing the outrush of gas. Should such pressure differential decrease, then ball 21 may move away from seat 53 to permit resumption of such flow.

A similar effect may happen if the tank is knocked over onto its side. Should this occur, the weight of the ball will be normal to seat 53, as opposed to being diametrically opposite. Hence, a lower pressure differential will be sufficient to urge the ball into sealing engagement with seat 53.

Another feature of the improved valve assembly occurs when the tank is to be refilled through the valve. During such refilling operation, liquid and/or gas is supplied through outlet 32 and inlet 31, to enter tank 11. However, care must be taken not to overfill the tank. As fluid flows into the tank, liquid level L rises. Finally, when the predetermined maximum liquid level is reached, the nose of member 58 moves to its out-of-the-way position (FIG. 3), thereby allowing ball 21 to engage seat 52. The pressure differential between the outlet and inlet will hold ball 21 firmly against seat 52 to prevent further flow into the tank.

Thus, while it operates ostensibly as a conventional cylinder valve during normal operation, the improved valve assembly has an auxiliary valving element which prevents an overfilled condition, which blocks the passageway in the event of a sudden outrush of gas, and blocks the passageway should the tank be tipped over. However, these additional features do not interfere with normal use of the cylinder, but remain in a standly condition awaiting the occurrence of a triggering event.

Of course, many changes and modifications may be made. While ball 21 is preferably metal, this spherical shape and the material of which it is constructed may be readily varied. The linkage coupling the float with the valve element may also be varied. Sizes, proportions, and materials of construction are all regarded as within the ambit of one skilled in this art.

Therefore, while the presently preferred embodiment of the inventive valve assembly has been shown and described, and several modifications thereof discussed, persons skilled in this art will readily appreciate that various additional changes and modifications may be made without departing from the spirit of the invention, as defined and differentiated by the following claims.

What is claimed is:

1. A valve assembly adapted to be mounted on a fuel storage tank, comprising:

a body adapted to be mounted on said tank, said body having an inlet arranged within said tank and having an outlet arranged without said tank, and having an internal passageway communicating said inlet and outlet, said body also having first, second and third valve seats surrounding said passageway;

a flow metering valve operatively mounted on said body and having a member selectively movable toward and away from said first valve seat for controlling the flow of fluid through said passageway;

a valve element mounted in said passageway for movement between said second and third seats, said element being arranged to prevent flow through said passageway from said outlet to said inlet when said element engages said second seat, said element being further arranged to sealingly engage said third seat if a differential between the pressures at said inlet and outlet exceeds a predetermined maximum pressure differential; and a float mounted on said body and arranged to sense the level of liquid in said tank, said float being operative to hold said element off said second seat when the sensed liquid level is less than a predetermined maximum level, and opposite to permit said element to engage said second seat when the sensed liquid level is greater than said predetermined maximum level.

2. A valve assembly as set forth in claim 1 wherein said first and second seats face away from said inlet.

3. A valve assembly as set forth in claim 1 wherein said third seat is arranged to face toward said inlet.

4. A valve assembly as set forth in claim 1 wherein said valve element is a spherical ball.

5. A valve assembly as set forth in claim 1 and further comprising an intermediately-pivoted arm mounted on said body, and wherein one end of said arm is connected to said float and the other end of said arm may engage said element when the sensed liquid level is less than said predetermined maximum level.

* * * * *